United States Patent
Swim, Jr. et al.

(10) Patent No.: US 12,212,054 B2
(45) Date of Patent: Jan. 28, 2025

(54) RADIO FREQUENCY ENABLED THEMATIC INTERFACE SYSTEMS AND METHODS

(71) Applicant: Universal City Studios LLC, Universal City, CA (US)

(72) Inventors: Richard Joseph Swim, Jr., Belle Isle, FL (US); George Peter Gakoumis, Jr., Orlando, FL (US); Matthew Tangan Usi, Orlando, FL (US); Jason William Hawk, Sanford, FL (US); Anthony Louis Mandile, Orlando, FL (US); Brian Matthew Stuckey, Davenport, FL (US); Vanessa Rachael Luedtke, Orlando, FL (US); Douglas Evan Goodner, Weston, FL (US)

(73) Assignee: Universal City Studios LLC, Universal City, CA (US)

( * ) Notice: Subject to any disclaimer, the term of this patent is extended or adjusted under 35 U.S.C. 154(b) by 427 days.

(21) Appl. No.: 17/679,677

(22) Filed: Feb. 24, 2022

(65) Prior Publication Data

US 2022/0181774 A1    Jun. 9, 2022

Related U.S. Application Data

(62) Division of application No. 16/218,228, filed on Dec. 12, 2018, now Pat. No. 11,296,404.

(Continued)

(51) Int. Cl.
*H04M 1/02* (2006.01)
*B32B 3/30* (2006.01)
*B32B 7/05* (2019.01)
*B32B 7/12* (2006.01)
*B32B 15/095* (2006.01)
*B32B 27/40* (2006.01)
(Continued)

(52) U.S. Cl.
CPC ............. *H01Q 1/44* (2013.01); *B32B 3/30* (2013.01); *B32B 7/05* (2019.01); *B32B 7/12* (2013.01); *B32B 15/095* (2013.01); *B32B 27/40* (2013.01); *H01Q 1/2291* (2013.01); *H01Q 1/38* (2013.01); *H04B 5/00* (2013.01); *H04M 1/0283* (2013.01); *B32B 2264/105* (2013.01); *B32B 2307/20* (2013.01); *B32B 2307/41* (2013.01); *B32B 2307/414* (2013.01); *B32B 2457/00* (2013.01)

(58) Field of Classification Search
CPC .................................................. H04M 1/0283
See application file for complete search history.

(56) References Cited

U.S. PATENT DOCUMENTS

7,520,800 B2    4/2009   Duescher
8,062,098 B2   11/2011   Duescher
(Continued)

*Primary Examiner* — Nathan H Empie
(74) *Attorney, Agent, or Firm* — Fletcher Yoder, PC (57) ABSTRACT

An interface in accordance with present embodiments includes a base and a theme portion disposed on the base. A first layer is disposed on the base and includes a mixture with metallic powder suspended within a translucent medium. A second layer is disposed on the base over the first layer and over the theme portion, and includes the mixture. A third layer is disposed on the base and on the theme portion over only portions of the second layer. The third layer includes paint and paint thinner. A fourth layer is disposed on the theme portion over the third layer and exposed portions of the second layer. The fourth layer also includes the mixture.

10 Claims, 4 Drawing Sheets

Related U.S. Application Data

(60) Provisional application No. 62/597,814, filed on Dec. 12, 2017.

(51) Int. Cl.
*H01Q 1/22* (2006.01)
*H01Q 1/38* (2006.01)
*H01Q 1/44* (2006.01)
*H04B 5/00* (2006.01)

(56) References Cited

U.S. PATENT DOCUMENTS

| | | |
|---|---|---|
| 8,519,424 B2 | 8/2013 | Hammond et al. |
| 8,927,315 B1 | 1/2015 | Sheats et al. |
| 2003/0102151 A1* | 6/2003 | Hirose ............... H05K 3/244 |
| | | 174/250 |
| 2005/0032469 A1 | 2/2005 | Duescher |
| 2010/0003904 A1 | 1/2010 | Duescher |
| 2010/0076527 A1 | 3/2010 | Hammond et al. |
| 2012/0120570 A1* | 5/2012 | Shin ............... H04M 1/0283 |
| | | 361/679.01 |
| 2014/0163664 A1 | 6/2014 | Goldsmith |
| 2016/0263698 A1* | 9/2016 | Noirot ............... B23K 26/359 |

* cited by examiner

RADIO FREQUENCY ENABLED THEMATIC INTERFACE SYSTEMS AND METHODS

CROSS-REFERENCE TO RELATED APPLICATIONS

This application is a divisional of U.S. patent application Ser. No. 16/218,228, entitled "RADIO FREQUENCY ENABLED THEMATIC INTERFACE SYSTEMS AND METHODS", filed Dec. 12, 2018, which claims priority from and the benefit of U.S. Provisional Application Ser. No. 62/597,814, entitled "RADIO FREQUENCY ENABLED THEMATIC INTERFACE SYSTEMS AND METHODS" filed Dec. 12, 2017, which are herein incorporated by reference in their entireties for all purposes.

BACKGROUND OF THE INVENTION

The present disclosure relates generally to the field of amusement parks. More specifically, embodiments of the present disclosure relate to methods and equipment used in conjunction with amusement parks.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Since the early twentieth century, amusement parks (or theme parks) have substantially grown in popularity. In addition to amusement park rides, the amusement park may include interactive items distributed throughout the amusement park. However, technological components of the interactive items may be discordant with themes of the amusement park. Accordingly, improved interactive items that consistently adhere to a theme of the amusement park may be desirable to enhance patron experience.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a system includes an interface having a faceplate with a base portion and one or more raised portions. The interface includes a first layer disposed on the faceplate such that the first layer is distributed over the base portion and such that first layer is not distributed over at least part of a top surface of the one or more raised portions. The first layer includes a mixture having metallic powder suspended within a solid medium. The interface further includes a second layer disposed on the first layer and on the one or more raised portions. The second layer includes the mixture and is distributed over the part of the top surface of the one or more raised portions. A third layer is disposed on only portions of the second layer, and includes paint and paint thinner. A fourth layer is disposed on the second layer that is disposed on the one or more raised portions, and includes the mixture.

In another embodiment, an interface includes a base and a theme portion disposed on the base. A first layer is disposed on the base and includes a mixture with metallic powder suspended within a translucent medium. A second layer is disposed on the base over the first layer and over the theme portion, and includes the mixture. A third layer is disposed on the base and on the theme portion over only portions of the second layer. The third layer includes paint and paint thinner. A fourth layer is disposed on the theme portion over the third layer and exposed portions of the second layer. The fourth layer also includes the mixture.

In a further embodiment, a method includes applying a first layer to a faceplate having one or more raised portions. The mixture includes metal particles suspended in a translucent medium. The method further includes removing the first layer from the one or more raised portions of the faceplate, and applying a second layer, having the mixture, to the faceplate. The second layer is thinner than the first layer. The method further includes applying a third layer, having paint and paint thinner, to the faceplate, and applying a fourth layer, having the mixture, to the one or more raised portions of the faceplate. The fourth layer is thinner than the first layer.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Recently there has been a growing interest in interactive amusement park experiences. Indeed, aside from rides and games of an amusement park, the amusement park itself may include elements through which patrons may interact to enable various features of the amusement park. For example, a patron may interact with an interface, or theme element, to enable one or more special effects, establish a virtual position within a queue, access personal storage, and so forth. Further, in some instances, the interface may be formed in accordance with a theme of the amusement park, such as through utilization of certain theme-conducive materials. As a specific example, theme-conducive materials may resemble stone or metal. In some instances, the interface may be interactive through radio frequency and colored light. However, while materials such as stone or metal may be inherent to the theme of the amusement park, these materials may block radio frequencies and transmission of light, thereby limiting patron interaction with the interface. In particular, in one example, the appearance of a medallion or other type of metal object may be in keeping with a desired theme. However, because metal blocks RF transmissions, such objects may not be suitable for facilitating RF interaction.

As seen in the figures below, the disclosed embodiments generally relate to an interface for radio frequency (RF) enabled interaction. More specifically, the interface may utilize radio frequency identification (RFID), radio frequency proximity (RFProx), or the like, to enable communication with a portable device. The portable device may be worn by a patron to enable interaction between the patron and the interface. To this end, the interface may be formed to resemble a stone or a metal structure in accordance with a theme of an amusement park while still enabling RF communication. Indeed, the use of stone or metal in the interface may otherwise inhibit communication through RF transmission.

Further, the interface may utilize colored light to communicate feedback to the patron based on the patron's interaction with the interface. Accordingly, the interface may appear to be an opaque material in keeping with the desired thematic appearance while providing translucent sections through which light may be displayed. For example, in some instances, such as before interaction with the portable device, the interface may appear as an opaque solid material such as stone or metal. Further, in some instances, such as after an interaction with the portable device, light may be displayed on or through one or more portions of a surface of the interface. In other words, the interface may utilize a dead front type display. Accordingly, the interface may be formed through various layers of materials which provide for RF and light transmission while appearing in accordance with a theme of the amusement park.

Figure 1:
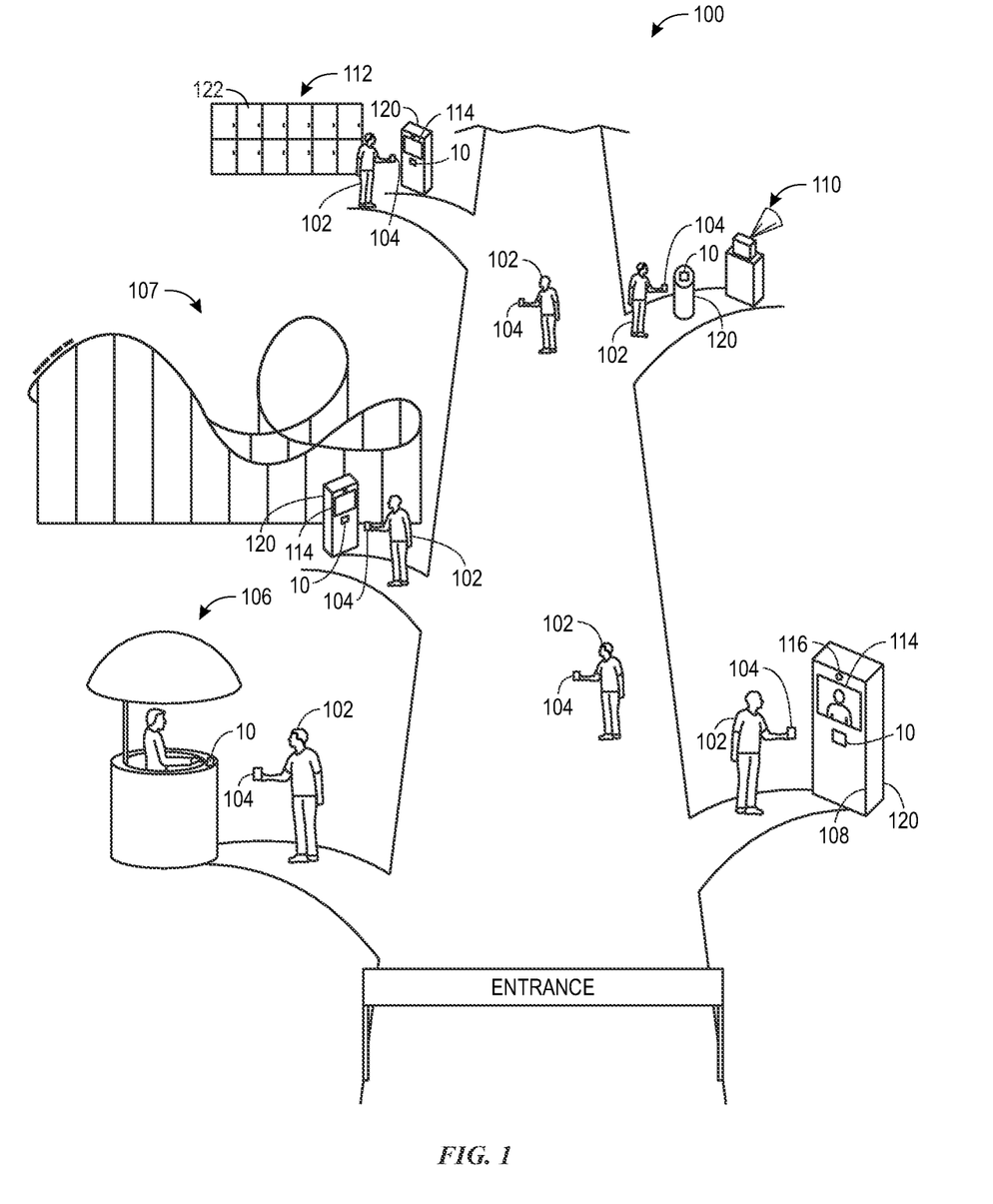
FIG. 1 is a schematic view of an embodiment of an amusement park, in accordance with the present disclosure.

Keeping this in mind, FIG. 1 is a view of an embodiment of an amusement park 100, which may utilize interfaces 10 through which patrons 102 (e.g., users) may interact to enable various effects throughout the amusement park 100. Upon initial observation of the interface 10, the interface 10 may appear to patrons as an object that is not capable of a technological function, such as to enable a special effect. That is, the interface 10 may be configured to appear as an inert or low technology item, such as a rock, bronze age artifact, or archeological remnant. Indeed, as discussed herein, the façade of the interface 10 may be particularly designed to mask the technological capabilities of the interface 10 in order to surprise the patron 102 upon interaction with the interface 10. For example, upon interaction with the interface 10, the interface 10 may glow, or emit/transmit light, despite the interface 10 initially appearing to be substantially opaque, and may cause one or more effects within the amusement park 100 to occur.

In some embodiments, the patrons 102 may utilize a portable device 104 (e.g., a personal device) to interact with the interface 10. The portable device 104 may be included in a wrist band that the patron 102 my wear throughout the amusement park 100. Further, in certain embodiments, the portable device 104 may be a personal electronic device, such as a smart phone, that is programmed to interact with the interface 10. Generally, the patron 102 may place the portable device 104 proximate to the interface 10 to enable communication, via radio frequency (RF), between the portable device 104 and internal components of the interface 10. In other words, the interface 10 may be configured to transmit RF signals between the portable device 104 and the internal components of the interface 10. As discussed in further detail below with reference to FIG. 2, the internal components of the interface 10 may include at least a controller, communication circuitry, and a light source. The RF communication between the portable device 104 and the interface 10 may cause a variety of effects to occur depending on an intended or pre-programmed purpose of the internal components of the interface 10. Indeed, it should be understood that, as used herein, interaction between the interface 10 and the portable device 104 may specifically refer to interaction between the internal components of the interface 10 and the portable device 104 via transmission of RF signals through the interface 10. For example, the portable device 104 may communicate with the interface 10 to purchase goods or services from a store 106, establish a position in a virtual queue for an attraction 107, take a picture with a photo booth 108, enable a special effect 110, access personal storage 112, or any other suitable effect.

As mentioned above, the patrons 102 may utilize the interface 10 to purchase goods and/or services from the store 106. Accordingly, in certain embodiments, the portable device 104 may be linked to a bank account or credit card associated with the patron 102. Similarly, the interface 10 (e.g., the internal components of the interface 10) may be communicatively coupled to a register, or other payment device. In this way, the patron 102 may select goods and/or services from the store 106 for purchase, and utilize the portable device 104 to interact with the interface 10 to pay for the goods and/or services. Particularly, to pay for the goods or service, the patron 102 may place the portable device 104 adjacent to, or in contact with, the interface 10. In doing so, one more RF signals may be transmitted through the interface 10 between the portable device 104 and the internal components of the interface 10 to complete the transaction.

Further, in some embodiments, the patron 102 may utilize the interface 10 to take a photograph with the photo booth 108, or other photography device. To illustrate, the patron 102 may place the portable device 104 adjacent to the interface 10, which may be coupled to the photo booth 108. That is, it may be mounted to an external surface of the photo booth 108. One or more internal components of the interface 10 may communicate with the portable device 104 via transmission of RF signals through the interface 10 when the portable device 104 is placed adjacent to the interface 10. The internal components of the interface 10 may be communicatively coupled to a display 114 and a camera 116 of the photo booth 108. In this way, when the portable device 104 communicates with the internal components of the interface 10, the internal components may cause the display 114 to communicate feedback (e.g., via displayed images) to the patron 102. The feedback of the display 114 may notify the patron 102 that the camera 116 is preparing to take a photograph and/or video of the patron 102. The display 114 may also communicate a preview of the impending photograph, or other options related to the photograph.

The interface 10 may also be utilized by the patron 102 to establish a position in a virtual queue for an attraction 107 of the amusement park 100. To illustrate, the patron 102 may place the portable device 104 adjacent to the interface 10, which may be coupled to a kiosk 120, or other structure, associated with the attraction 107. As discussed above, when the portable device 104 is placed adjacent to the interface 10, one or more internal components of the interface 10 may communicate with the portable device 104 via transmission of RF signals through the interface 10. The internal components of the interface 10 may be coupled to the display 114 of the kiosk 120. Accordingly, the display 114 may communicate feedback to the patron 102 to confirm that the internal components of the interface 10 have successfully communicated with the portable device 104 to establish a position of the patron 102 within the virtual queue. For example, the feedback communicated via the display 114 may indicate a time in which the patron 102 will have access to the attraction 107, or when the position of the patron 102 has reached a front of the virtual queue.

Further, in some embodiments, the interface 10 may be utilized by the patron 102 to utilize a special effect 110 of the amusement park 100. To illustrate, the patron 102 may place the portable device 104 adjacent to the interface 10, which may be coupled to a kiosk 120, or other structure, associated with the special effect 110. As discussed above, when the portable device 104 is placed adjacent to the interface 10, one or more internal components of the interface 10 may communicate with the portable device 104 via transmission of RF signals through the interface 10. Indeed, the internal components of the interface 10 may be communicatively coupled to components of the special effect 110. In this way, once the internal components of the interface 10 communicate with the portable device 104, the internal components of the interface 10 may cause the special effect 110 to initiate. For example, initiation of the special effect 110 may include initiation of a water effect (e.g., water spray/squirt/projection), a sound effect, a movement (e.g., vibration) effect, or any other suitable type of special effect. To this end, the interface 10 may be water proof, or water resistant, in that the interface 10 prevents water from reaching the internal components of the interface 10.

In another example, the interface 10 may be utilized by the patron 102 to access personal storage 112, such as lockers. Specifically, the patron 102 may place the portable device 104 adjacent to the interface 10, which may be coupled to a kiosk 120, or other structure, associated with the personal storage 112. The internal components of the interface 10 may be coupled to the display 114 of the kiosk 120. Accordingly, the display 114 may communicate feedback to the patron 102 to confirm that the internal components of the interface 10 have successfully communicated with the portable device 104. For example, the display 114 may display images to indicate that a personal storage container 122 associated with the portable device 104 is unlocked, and the location of the personal storage container 122.

Generally it should be understood that communication between the interface 10 and the portable device 104 may be utilized to for a variety of purposes. As a further example, in some embodiments, interaction between the interface 10 and the portable device 104 may be utilized to track locations of patrons 102 throughout the amusement park 100. Further in some embodiments, interaction between the portable device 104 and the interface 10 may be utilized to access public transportation or personal lodging.

Figure 2:
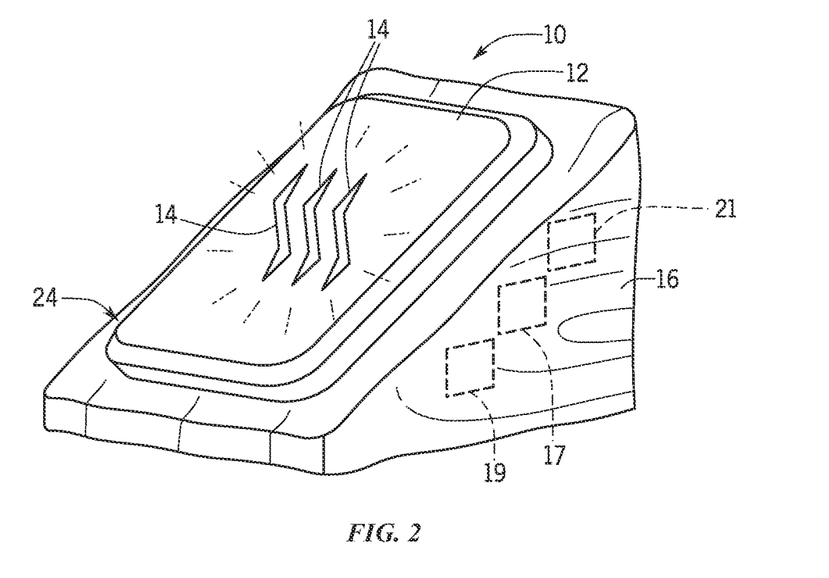
FIG. 2 is a perspective schematic view of an embodiment of an interface that may be used in the amusement park of FIG. 1, in accordance with the present disclosure.

Keeping this in mind, FIG. 2 is a perspective view of an interface 10 which may provide for the transmission of radio frequency (RF) and light. The interface 10 may include a base 12, and one or more raised portions 14, or theme portions, which may be in the shape of a design or emblem in accordance with a theme of the amusement park 100. In certain embodiments, the interface 10 may be coupled to a theme element 16. The theme element 16, as shown in FIG. 2, is merely intended to be an example of one embodiment of a theme element. Indeed, the theme element 16 may be any suitable types of structure, which may be located in a variety of locations throughout the amusement park having a variety of purposes, as discussed above in FIG. 1. That is, in certain embodiments, the theme element 16 may be the store 106, the photo booth 108, the kiosk 120, a totem, a table, or any other suitable surface/object capable of the functions of the theme element 16 as discussed herein. The theme element 16 may house the internal components of the interface 10, as referenced in FIG. 1. Particularly, the internal components may include communication circuitry 17, one or more lighting systems 19 (e.g., LEDs), a controller 21, a speaker/sound system, and so forth.

The controller 21 may employ a processor, which may represent one or more processors, such as an application-specific processor. The controller 21 may also include a memory device for storing instructions executable by the processor to perform the methods and control actions described herein for the amusement park 100. The processor may include one or more processing devices, and the memory may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor or by any general purpose or special purpose computer or other machine with a processor.

The communication circuitry 17 enables intercommunication between the portable device 104, the controller 21, and elements associated with the theme element 16, such as the camera 116, the display 114, the special effect 110, and so forth. Particularly, the communication circuitry 17 enables the communication via transmission of RF signals through the interface 10. Indeed, in some embodiments, the communication circuitry 17 may utilize radio-frequency identification [RFID] to enable the communication through the interface 10. To this end, in certain embodiments, the communication circuitry 17 may include an RFID antenna, which may extend substantially throughout, or along a surface, of the interface 10. The RFID antenna is configured to communicate with the portable device 104 via RF. In some embodiments, the communication circuitry 17 may communicate through a wireless network, such as wireless local area networks [WLAN], wireless wide area networks [WWAN], near field communication [NFC], Wi-Fi, and/or Bluetooth. In some embodiments, the communication circuitry 17 may communicate through a wired network such as local area networks [LAN], or wide area networks [WAN].

The raised portion 14 may be translucent, or semi-transparent, and configured to transmit light while the base 12 may be substantially opaque and configured to block light. Moreover, as discussed in further detail below, the interface 10 as a whole, may be configured to transmit RF. Indeed, the radio frequency communication circuitry 17 may be configured to transmit RF through the interface 10 to communicate with the portable device 104, which is also configured to communicate through RF. Further, the lighting system 19 may be configured to transmit light through one or more portions of the interface, according to interaction with the interface 10. That is, upon communication between the portable device 104 and the interface 10, the lighting system 19 may emit light, which may observed within the raised portion 14.

Figure 3:
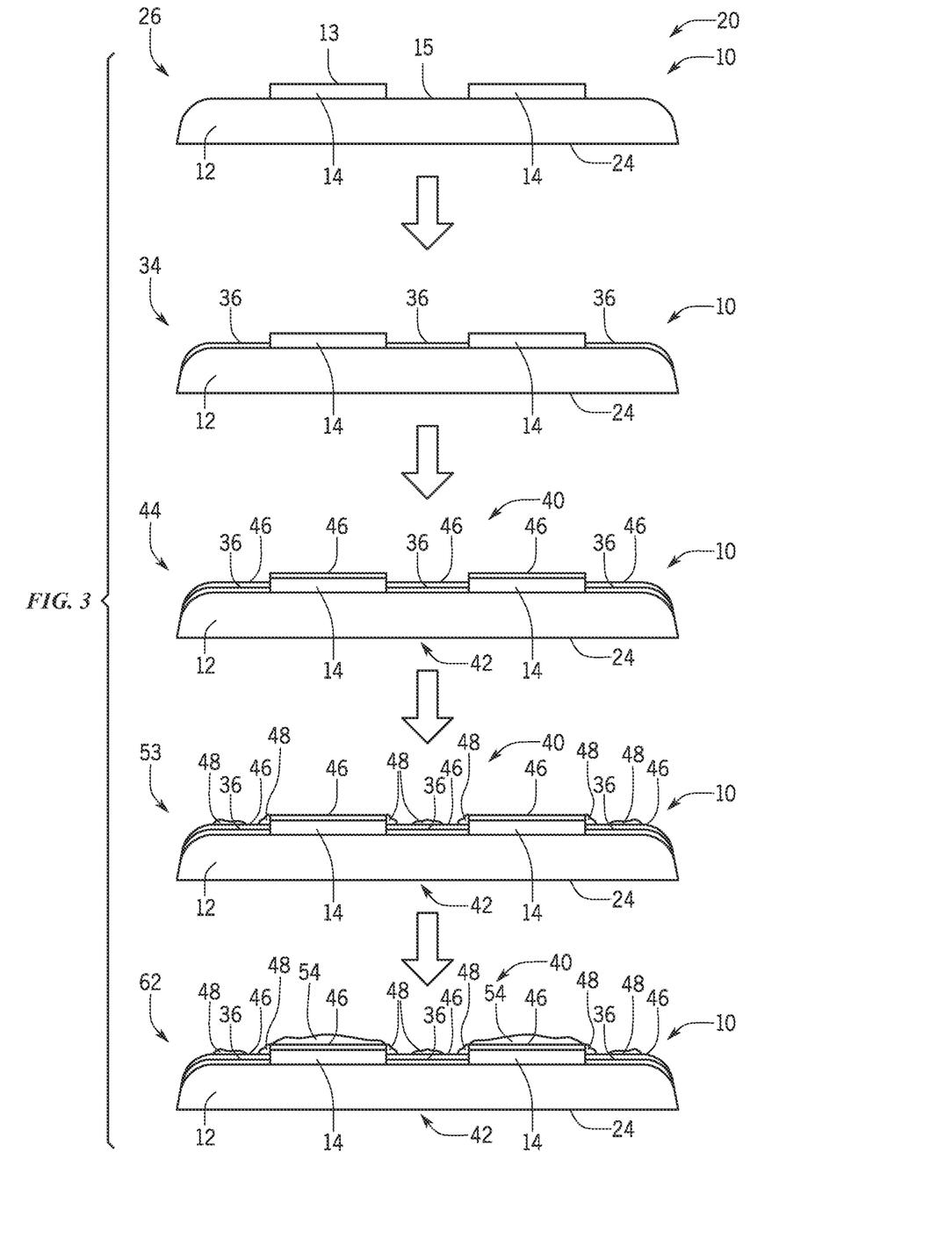
FIG. 3 is a set of cross-sectional views of stages of an embodiment of a fabrication process of the interface of FIG. 2, in accordance with the present disclosure.
Figure 4:
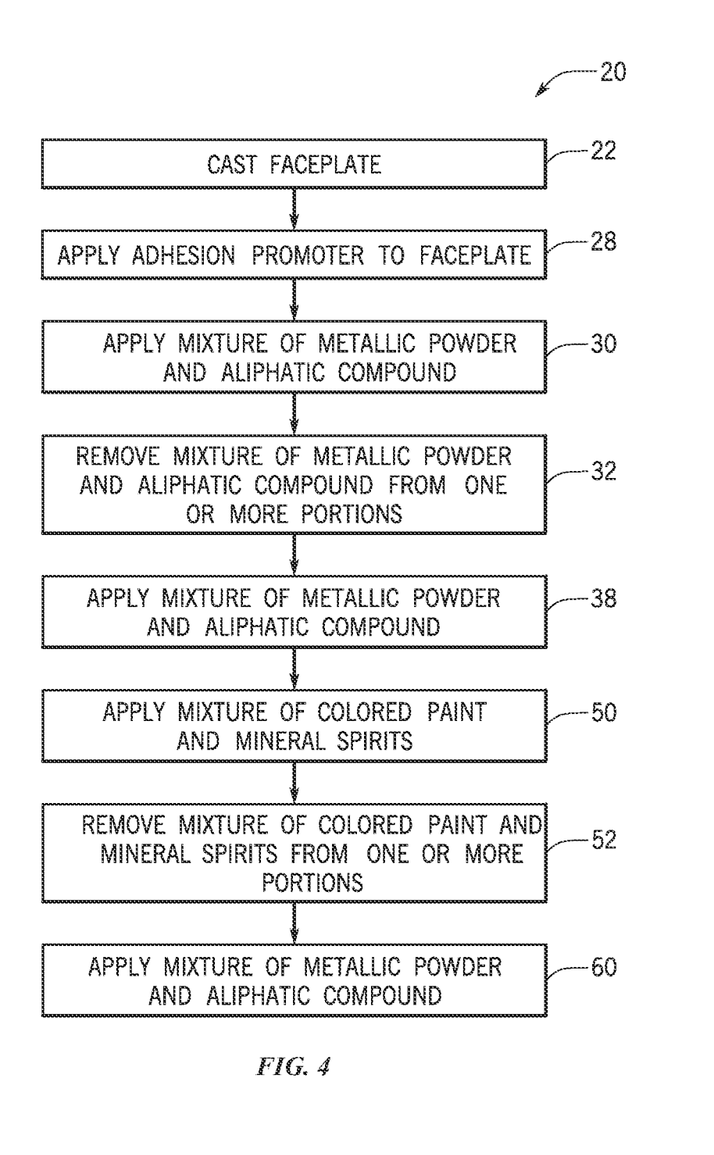
FIG. 4 is a flow diagram of an embodiment of a fabrication process of the interface of FIG. 2, in accordance with the present disclosure.

To this end, FIGS. 3 and 4, which may now be discussed in parallel, illustrate embodiments of a process 20 to manufacture the interface 10 such that the interface 10 is configured to transmit RF and light as described herein. To form the interface 10, a faceplate 24 of the interface 10 may be formed via casting clear urethane resin in a silicone mold (block 22). Particularly, it should be noted that the faceplate 24 of FIG. 3 is the casting that is formed as described in block 22 of FIG. 4. The faceplate 24 may include the base 12 and the one or more raised portions 14 that protrude from or are raised relative to a surface 15 of the base. The raised portions 14 include a top raised surface 13. In some embodiments, the clear urethane resin may be CRYSTAL CLEAR® Urethane Resin manufactured by Smooth-On of Macungie, PA. In certain embodiments, the faceplate 24 may be formed via casting of any suitable clear material. The faceplate 24 is then post cured at approximately 150 degrees Fahrenheit for approximately six hours. However, in certain embodiments, the faceplate 24 may be cured at any other suitable temperature for any suitable amount of time. An embodiment of the resulting faceplate 24 is shown as a first phase 26 of the process 20 (FIG. 2).

Further, it should be noted that, as discussed herein, the interface 10 may refer to the faceplate 24 and features added to the faceplate 24, such as layers of paint and other deposits. Indeed, the interface 10, as referenced herein, may refer to each of the individual phases of the process 20 as depicted in FIG. 3, and the various features (e.g., the faceplate 24 and the layers) associated with each of the phases. That is, embodiments referenced by the term, "interface 10", may change throughout the description of the process 20. It should also be noted that while a specific series of steps for depositing layers is disclosed with respect to the illustrated embodiment, other embodiments may utilize templates or a rearrangement of steps to achieve the same results. Further, while the disclosed techniques are described in the context of a faceplate including one or more raised portions 14, it should be understood that the faceplate 24 may additionally or alternatively include recessed portions or may be irregularly shaped. In one embodiment, the disclosed layers may be applied to some portions of the surface 15 in a similar manner as discussed with regard to the raised portions 14. That is, the partial removal may be implemented on flat or planar portions of the surface 15.

An adhesion promoter (e.g., a primer) is then applied to the interface 10 once the faceplate 24 is cleaned and dried (block 28). Next, a blended mixture of metallic powder (e.g., metallic flakes) and a clear, or substantially clear (e.g., translucent), material, such as an aliphatic compound, is applied to the interface 10 on the adhesion promoter as a first layer 36 (block 30). As used herein, translucent may be defined as clear, substantially clear, able to transmit at least some light (e.g., 80% or greater), or a combination thereof. Thus, the first layer 36 includes the adhesion promoter and the blended mixture. However, in some embodiments, no adhesion promoter may be used such that the first layer 36 includes the blended mixture but not the adhesion promoter. In some embodiments, the aliphatic compound may be Industrial Coatings Acrylic/Aliphatic Polyurethane Clear Satin Enamel manufactured by Richard's Paint Manufacturing Company, Inc. of Rockledge, FL. In certain embodiments, any suitable substance that is substantially clear, durable, chemically resistant, and easily applicable to the material of the faceplate 24, may be used in place of the aliphatic compound. In certain embodiments, the mixture of metallic powder and aliphatic compound may be sprayed with two passes, or applied through any other suitable means, and allowed to tack up (e.g., at least partially dry). Further, the metallic powder may be a combination of different colored metallic powders. For example, the metallic powder may be formed in a two to one ratio of an antique-bronze-color metallic powder and a rich-pale-gold-color metallic powder, respectively. However, in some embodiments, the metallic powder may be formed with any suitable colors of metallic powder in any suitable ratio, which may depend on a theme of the amusement park 100.

Once the mixture of metallic powder and aliphatic compound (e.g., "the mixture") has been applied to the faceplate 24, the mixture may be removed from certain portions of the faceplate 24, such as the raised portions 14 (block 32). In certain embodiments, the mixture may be wiped away from the raised portions 14 using a rag. Further, in certain embodiments, the mixture may be removed from the raised portions 14 utilizing a clearing agent, or solvent, such as xylene. An embodiment of the interface 10, once the mixture has been removed from the raised portions 14, is shown as a second phase 34 of the process 20 (FIG. 3).

Once the mixture has been removed from the raised portions 14 (and/or some other portion of the faceplate 24), the mixture (e.g., the same mixture) may once again be applied to the interface 10 (block 38) as a second layer 46. Particularly, the mixture may be applied (e.g., with a certain amount of thickness) such that the interface 10 appears substantially opaque from a front 40, and once light (e.g., from the lighting system 19) is applied from a rear 42, only the raised portions 14, (or other portions from which the mixture was removed) may substantially display the light. While some limited amount of light may pass through other areas intended to be substantially opaque (e.g., the base 12), the amount of light passing through the other areas may be negligible (e.g., less than 5%, 4%, 3%, 2%, or 1% of light may pass through) such that the other areas appear opaque relative to the amount of light passing through the raised portions 14, or other portions intended to be illuminated. An embodiment of the interface 10 once the mixture has been applied to the interface 10 is shown as a third phase 44 of the process 20 (FIG. 2). Particularly, in certain embodiments, the second layer 46 may be substantially thinner than the first layer 36 such that the first layer 36 may be substantially opaque on its own while the second layer 46 is at least partially translucent and configured to transmit light. Once the second layer 46 of the mixture is applied to the interface 10, the interface 10 is given time to cure, or dry and harden. It should be noted that in some embodiments, the second layer 46 is only applied to the portions of the interface 10 intended to be illuminated, such as the raised portions 14. In yet another embodiment, the layer referred to as the second layer 46 may be initially disposed on the interface 10 and the layer referred to as the first layer 36 may be subsequently disposed on the second layer 46. The so-called first layer 36 may then be removed from portions (e.g., the raised portions 14) intended to allow substantial light transmission or a template (or the like) may be used to avoid depositing the so-called first layer 36 on the portions intended to allow substantial light transmission.

Once the interface 10 is cured, paint that has been thinned with mineral spirits is applied (e.g., brushed on) as a third layer 48 to the interface 10 (block 50). In certain embodiments, the paint of the third layer 48 may be a mixture of Raw Umber and Lamp Black colored paints manufactured by the T.J. Ronan Paint Corporation of Bronx, NY. In such embodiments, the Raw Umber and Lamp Black may be mixed together in approximately a three to two ratio, respectively. Once the third layer 48 of paint thinned with mineral spirits is applied to the interface 10, a majority of the third layer 48 may be removed (e.g., wiped away) from the interface 10 utilizing a paint thinner, such as mineral spirits (block 52), such that the remaining portions of the third layer 48 may be disposed substantially only within recesses (e.g., depressions), or imperfections, on a surface of the interface 10. Indeed, while the surface of the interface 10 is depicted as substantially smooth, it should be noted that the interface 10 may include recesses such as corners, dimples, or other texturized formations including natural texturing of the underlying material. An embodiment of the interface 10 after the majority of the third layer 48 has been wiped away is shown as a fourth phase 53 of the process 20 (FIG. 2). Although not explicitly shown, it should be noted that the third layer 48 may be disposed within recesses of the base 12 and the one or more raised portions 14. Further, it should be noted that in some embodiments, the recesses of the interface 10 in which the third layer 48 is disposed may be formed a result of the application or curing of the second layer 46.

Once the third layer 48 has been generally removed from most portions of the interface 10, as described above, the third layer 48 may cure, or dry and harden. Specifically, the third layer 48 may provide an aged appearance or simulated patina to the interface 10.

Once the third layer 48 has cured, a mixture of metallic powder and aliphatic compound may be applied as a fourth layer 54 to the raised portions 14 of the interface 10, or other portions of the interface 10 that are intended to be at least partially translucent (block 60). In certain embodiments, the metallic powder of the fourth layer 54 may utilize a two to one ratio of rich pale gold and antique bronze colored metallic powders, respectively. The fourth layer 54 may be applied via lightly brushing over the raised portions 14, or other suitable portions, such that the fourth layer 54 is at least partially translucent. Once the fourth layer 54 is applied, the interface 10 may be cured, or allowed to dry and harden. An embodiment of the interface 10 after the fourth layer 54 has been applied to the raised portions 14 is shown as a fifth phase 62 of the process 20 (FIG. 3).

Once the process 20 is complete, the interface 10 may be coupled to the theme element 16 (FIG. 2) to be utilized within the amusement park 100. As discussed herein, the interface 10 may be configured to transmit RF and light from the theme element 16 while resembling an opaque (e.g., metallic) structure when viewed from the front 40. For example, the first layer 36, the second layer 46, and the fourth layer 54 may include a mixture of metallic powder (e.g., flakes) suspended within a substantially clear solid material, such as an aliphatic compound. Accordingly, the metallic powder suspended within the solid material may contribute to a metallic and opaque appearance of the interface 10. However, while the metallic powder may appear to be a solid and opaque piece of metal, there will be gaps between the particles of the metallic powder. In this manner, the RF may travel through the interface 10 between the gaps of the particles, thereby providing for transmission of RF (or other communication mediums of the communication circuitry 17, as discussed above) through the interface 10. Moreover, visible light may also travel through gaps between particles of the metallic powder of the second and fourth layers 46, 54. In this manner, the raised portions 14 may be illuminated on the front 40 of the interface 10 when light is applied from the rear 42 of the interface 10. Additionally or in the alternative to the interface 10 including the one or more raised portions 14 that are configured to be illuminated, the interface 10 may include one or more flat portions, or theme portions, that are substantially flat, or flush with the base 12, and configured to be illuminated. That is, in such embodiments, the one or more flat portions may include the second layer 46 and the fourth layer 54 such that the one or more flat portions may appear opaque, yet are configured to be illuminated through the transmission of visible light. The second layer 46 and the fourth layer 54 may be applied to the one or more flat portions through any suitable means such as stenciling, precise application (e.g., utilizing a paintbrush), and so forth. Indeed, layers may be applied to the one or more flat portions in a manner that is similar to the application of layers to the one or more raised portions 14, as described herein.

Further, it should be noted that the phases (e.g., first, second, third, fourth, and fifth phases 26, 34, 44, 53, 62) of FIG. 3 are intentionally simplified to focus on the layers (e.g., the first, second, third, and fourth layers 36, 46, 48, 54) disposed on the interface 10. Indeed, the thicknesses of each of the layers may not be drawn to scale and may vary from layer to layer. Further, it should be understood that, while the first, second, and third layers 36, 46, 48 are currently shown as being disposed substantially on horizontal surfaces of the interface 10, the first, second, and third layers 36, 46, 48 may similarly be disposed on the vertical, irregularly-shaped, or non-horizontal, surfaces of the raised portions 14 of the interface 10.

The embodiments disclosed herein provide a thematic interface that is configured to communicate with a portable device through radio frequencies (RF) and is configured to display lighting effects based on the communication with the portable device. Particularly, the thematic interface may appear to be an opaque material formed from metal or stone in accordance with a theme of an amusement park. That is, the thematic interface may be configured to create a permissible light effect, or dead fronting effect (e.g., the display/transmission of visible light) which may serve to surprise a patron of the amusement park when the thematic interface displays lighting effects despite initially appearing to be incapable of displaying light due at least to the opaque appearance of the thematic interface. To this end, the thematic interface may utilize metallic powder suspended in a solid medium to give the effect of opaqueness while allowing RF signals and light to pass through. Particularly, the RF signals may pass through the gaps between particles of the metallic powder.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
    applying a first layer, the first layer comprising a mixture of metal particles suspended in a translucent medium, to a faceplate comprising one or more raised portions;
    removing the first layer from the one or more raised portions of the faceplate;
    applying a second layer, comprising the mixture, to the faceplate, wherein the second layer is thinner than the first layer;

applying a third layer, comprising paint and paint thinner, to the faceplate; and applying a fourth layer, comprising the mixture, to the one or more raised portions of the faceplate, wherein the fourth layer is thinner than the first layer.

2. The method of claim 1, comprising:

removing a majority of the third layer from the faceplate prior to applying the fourth layer.

3. The method of claim 1, wherein applying the second layer to the faceplate comprises applying the second layer to the first layer and to the one or more raised portions of the faceplate.

4. The method of claim 1, comprising:

applying an adhesion promoter prior to applying the first layer.

5. The method of claim 1, comprising:

forming the faceplate with a translucent resin.

6. The method of claim 1, wherein removing the first layer comprises applying a solvent only to the raised portions of the faceplate.

7. The method of claim 1, comprising:

curing the faceplate prior to applying the first layer.

8. The method of claim 1, comprising:

drying the faceplate after applying the second layer, the third layer, the fourth layer, or a combination thereof.

9. The method of claim 1, wherein applying the third layer comprises applying the paint prior to applying the paint thinner.

10. The method of claim 1, comprising:

removing a the third layer from the one or more raised portions of the faceplate prior to applying the fourth layer.

\* \* \* \* \*